(12) United States Patent
Hyre et al.

(10) Patent No.: US 8,141,385 B2
(45) Date of Patent: Mar. 27, 2012

(54) GLASS CONTAINER FORMING MACHINE AND METHOD

(75) Inventors: Matthew R. Hyre, Lexington, VA (US); F. Alan Fenton, Granby, CT (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 12/862,465

(22) Filed: Aug. 24, 2010

(65) Prior Publication Data

US 2010/0313602 A1  Dec. 16, 2010

Related U.S. Application Data

(63) Continuation of application No. 11/890,056, filed on Aug. 3, 2007, now Pat. No. 7,779,649.

(51) Int. Cl.
| | |
|---|---|
| *C03B 9/03* | (2006.01) |
| *C03B 9/30* | (2006.01) |
| *C03B 9/36* | (2006.01) |
| *C03B 9/40* | (2006.01) |

(52) U.S. Cl. .................................. 65/29.1; 65/79; 65/82
(58) Field of Classification Search .................... 65/29.1, 65/110, 79, 82, 261, 264, 265
See application file for complete search history.

(56) References Cited

U.S. PATENT DOCUMENTS

| | | | |
|---|---|---|---|
| 2,309,290 | A | 1/1943 | Aksomitas |
| 2,347,181 | A | 4/1944 | Cox, Jr. |
| 4,508,557 | A | 4/1985 | Fenton |
| 4,726,833 | A | 2/1988 | Foster |
| 4,892,183 | A | 1/1990 | Fenton |
| 5,807,419 | A | 9/1998 | Rodriguez-Wong et al. |
| 2003/0101751 | A1 * | 6/2003 | Fenton et al. ................... 65/158 |

FOREIGN PATENT DOCUMENTS

| | | |
|---|---|---|
| FR | 1350353 A | 1/1964 |
| FR | 2147020 A1 | 3/1973 |
| RU | 272503 | 4/1969 |

OTHER PUBLICATIONS

Electric Drives and Their Controls, Richard M. Oxford Science Publications, 1995, pp. 188-191.

* cited by examiner

*Primary Examiner* — Matthew Daniels
*Assistant Examiner* — Cynthia Szewczyk
(74) *Attorney, Agent, or Firm* — Reinhart Boerner Van Deuren s.c.

(57) ABSTRACT

A blow head mechanism for an I.S. machine wherein the blow head has a final blow tube. The final blow tube is supported for vertical displacement between an up position where the open end of the final blow tube is proximate the top of a blown parison and a down position where the open end of the final blow tube is proximate the bottom of a blown parison. The final blow tube is oscillated a plurality of times during the time when the blow head is "on."

14 Claims, 17 Drawing Sheets

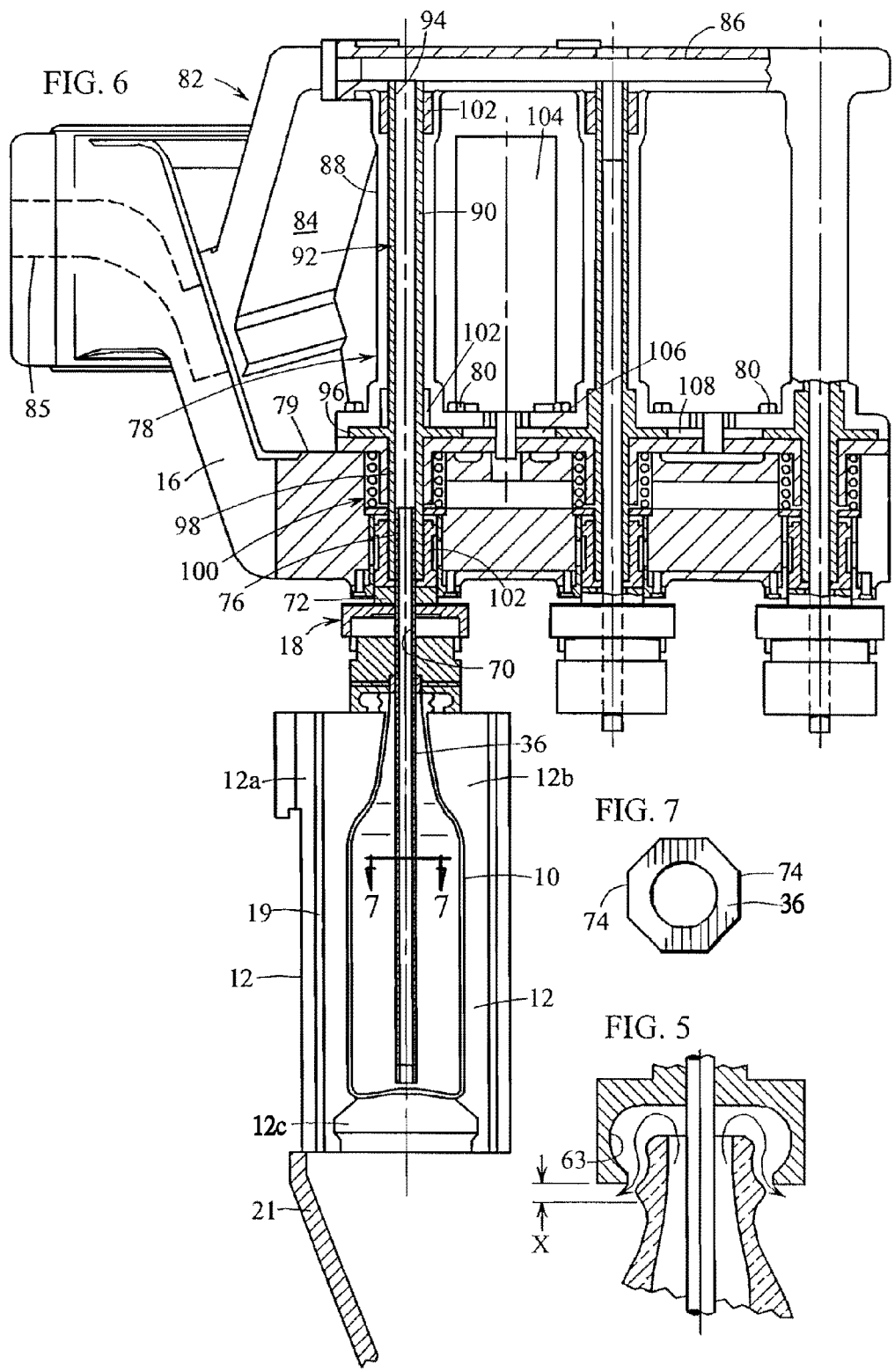

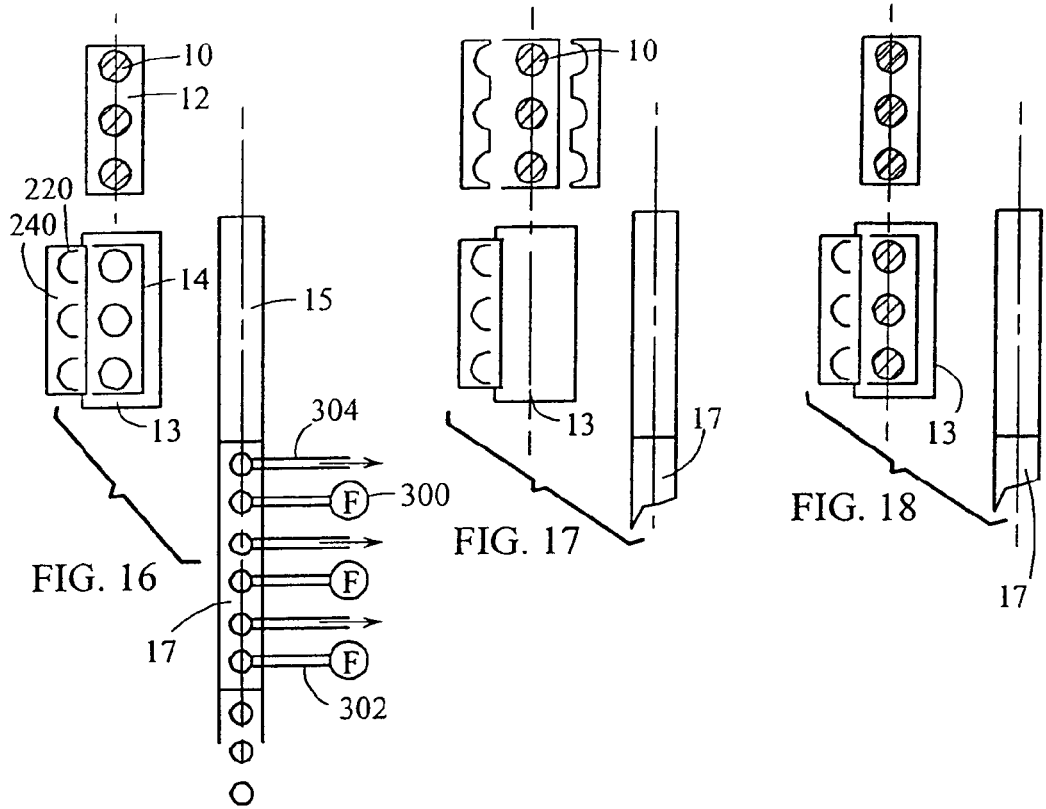
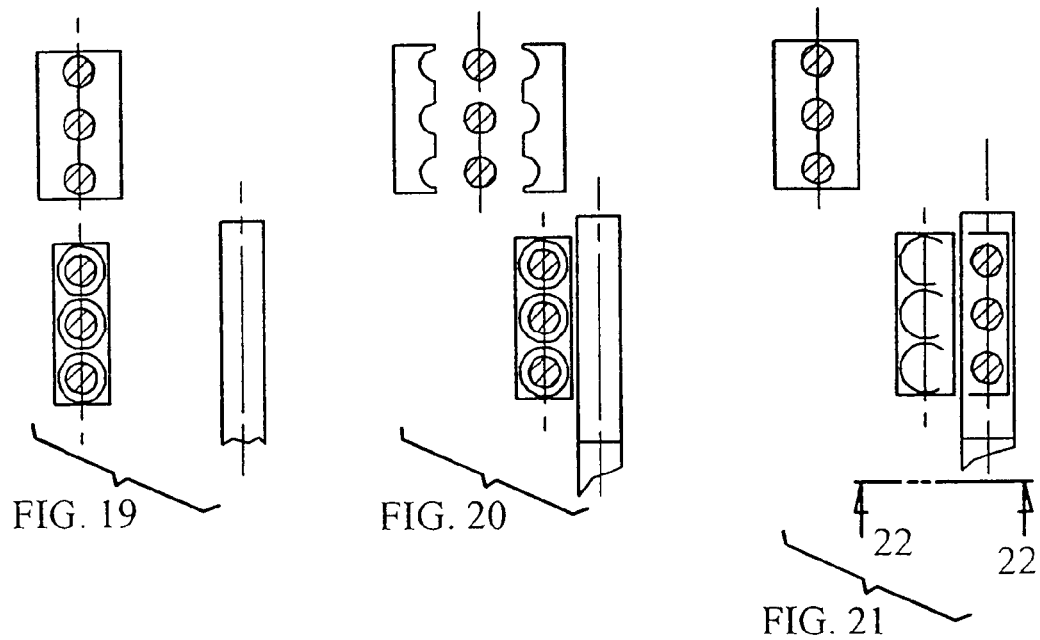

GLASS CONTAINER FORMING MACHINE AND METHOD

CROSS-REFERENCE TO RELATED APPLICATION

This application is a continuation of U.S. patent application Ser. No. 11/890,056, filed on Aug. 3, 2007, now U.S. Pat. No. 7,779,649, granted on Aug. 24, 2010, which is entitled "Glass Container Forming Machine," which patent application is assigned to the assignees of the present invention, which is a continuation of U.S. patent application Ser. No. 10/005,567, filed on Dec. 5, 2001, entitled Glass Container Forming Machine, now abandoned, both of which patent applications are hereby incorporated herein by reference in its entirety.

BACKGROUND OF THE INVENTION

Field of the Invention

The present invention relates generally to a blow head mechanism for an I.S. machine, and more particularly to a blow head mechanism having a final blow tube supported for vertical movement between an up position proximate the top of a blown parison and a down position proximate the bottom of a blown parison, wherein the final blow tube is oscillated a plurality of times.

The blowing operation is effected by a blow head. Conventionally the blow head is brought into position on top of (engaging) a blow mold at the blow station and provides air ("final blow") under pressure through a downwardly extending blow tube to the interior of the parison to blow the parison into contact with the interior of the blow mold. The parison could also be formed with vacuum or with a vacuum assist. The blown parison must then be formed into a bottle, i.e., cooled to the point where it is rigid enough to be gripped and removed from the blow station by a takeout mechanism. The outer surface of the blown parison is cooled by cooling the blow molds and the inner surface of the blown parison is cooled by the final blow air which continues to flow into the blown parison. U.S. Pat. No. 4,726,833, to Foster, which is assigned to the Assignee of the present patent application, discloses a state of the art blow head. Conventionally the cooling air escapes from the interior of the bottle through a permanently open exhaust. The size of the exhaust will be defined as a balance between inlet and outlet.

Before a conventional takeout can be displaced from a remote location to a pick up location proximate the top of the formed bottle, the blow head, including the blow tube, must be displaced away from the blow mold. This displacement must be at least to a position where it will not interfere with an inwardly moving takeout mechanism. To speed up these steps, U.S. Pat. No. 5,807,419, to Rodriguez-Wong et al., proposes a combined blow head and takeout mechanism. This mechanism permits the operation of takeout jaws as soon as the blow head, which engages the top of the blow mold during final blow, is slightly elevated, with the blow tube remaining fully extended and operating, following the formation of the bottle. The blow tube also provides internal cooling air to the bottle when the bottle is removed from the blow mold and carried to a dead plate on which it will be deposited. The cooling of the outer surface of the formed bottle stops with the opening of the blow mold.

U.S. Pat. No. 4,508,557, to Fenton, which is assigned to the Assignee of the present patent application, discloses a dead plate arrangement for blowing cooling air around the bottle to provide additional outer surface cooling on the deadplate. U.S. Pat. No. 4,892,183, to Fenton, which is assigned to the Assignee of the present patent application, discloses a dual take-out mechanism which functions to alternately remove bottles from the blow station placing half on one output conveyor and the other half on a second output conveyor.

In all of these systems, the bottles once removed from the deadplate, will be conveyed into a Lehr which utilizes a series of burners to immediately reheat the bottles to a uniform higher temperature and then allows the bottles to cool slowly before being discharged from the Lehr.

Formed bottles have also been tempered in separate machinery by reheating the bottles and then simultaneously cooling the inner and outer glass surfaces (see for example, U.S. Pat. No. 2,309,290, to Aksomitas).

It is desirable to provide an I.S. machine which more effectively removes heat from the blown parison/formed bottle.

SUMMARY OF THE INVENTION

The disadvantages and limitations of the background art discussed above are overcome by the present invention. With this invention, an I.S. machine is provided which more effectively removes heat from the blown parison/formed bottle.

A final blow tube is supported from a blow head for vertical displacement between an up position wherein the open end of the final blow tube is proximate the top of a blown parison and a down position wherein the open end of the final blow tube is proximate the bottom of a blown parison. The final blow tube is oscillated a plurality of times during the time when the blow head is "on."

DESCRIPTION OF THE DRAWINGS

These and other advantages of the present invention are best understood with reference to the drawings, in which:

FIG. 5 is an enlarged elevational view in section of the blow head at the exhaust position;

FIG. 6 shows an elevational view in cross section of the blow head mechanism made in accordance with the teachings of the present invention;

FIG. 7 shows a view of the cooling tube shown in FIG. 6 taken at 7-7 thereof;

FIGS. 16 through 21 illustrate one of the pair of synchronized takeout/deadplate mechanisms of the present invention moving through a single cycle;

DETAILED DESCRIPTION OF THE EXEMPLARY EMBODIMENT

Figure 1:
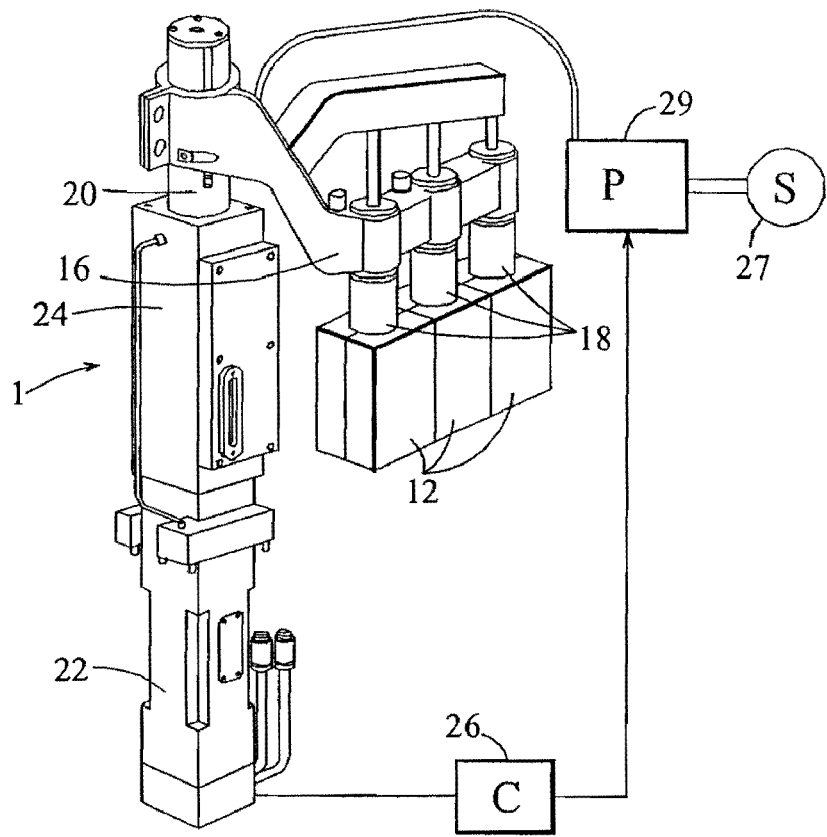
FIG. 1 shows a perspective view of a blow head mechanism made in accordance with the teachings of the present invention.

FIG. 1 shows a blow head mechanism 1 of the blow station of an I.S. machine embodying the invention. A triple gob machine is illustrated, and three forming molds, i.e. blow molds 12 arranged side by side are shown. A blow head arm 16 supports three blow heads 18. The blow head arm 16 is mounted on a vertical post 20 coupled to an electronic (servo) motor 22 which causes the blow head arm to move up and down. The post also rotates via a scroll cam (not shown) defined in a housing 24. Such up and down and rotary movement of the post 20 causes the blow heads 18 to be displaced between a retracted "off" position and an advanced "on" position, as shown in FIG. 1, at which the blow heads 18 engage the top of the blow molds 12. The operation of the servo motor is controlled by a control C (26). Air under pressure is supplied from a suitable source S (27) to a pressure regulator P (29) which will set the desired pressure for final blow as defined by the control C (26).

Figure 2:
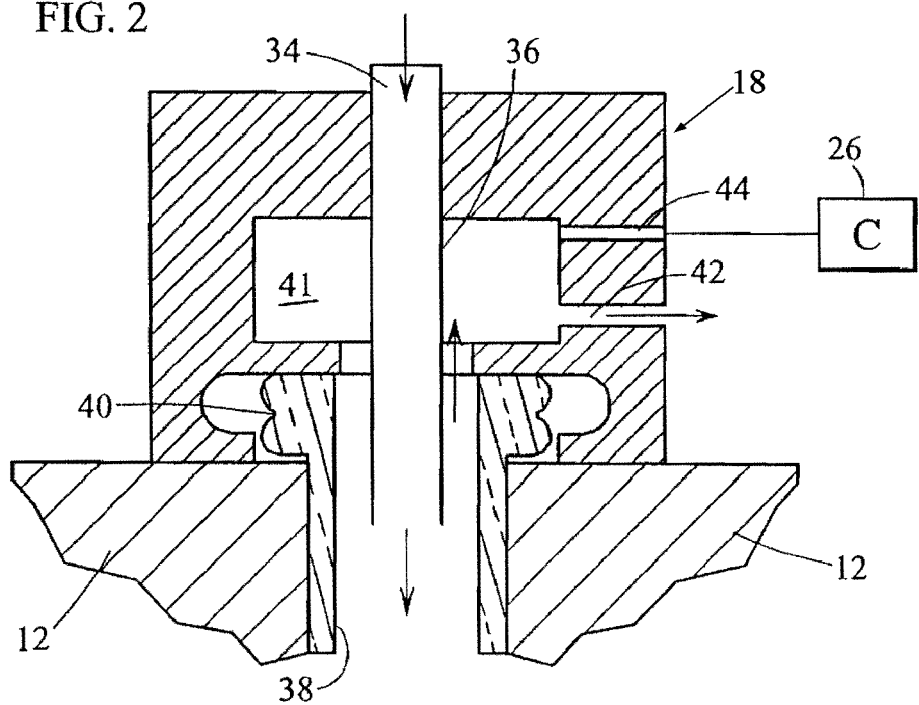
FIG. 2 shows a diagrammatic cross sectional view of the blow head of the blow head mechanism shown in FIG. 1.

A blow head 18 is shown diagrammatically, in section, in FIG. 2. The blow head 18 has an air inlet 34 leading to a blow or cooling tube 36 which extends downwardly into the parison 38. The blow head 18 surrounds the finish 40 of the parison (which forms the finish of the top or neck of the bottle). Final blow air blows the parison and then cools the interior surface of the blown parison. Air exhausts upwardly between the blow tube 36 and the parison into a chamber 41 and out through an adjustable exhaust 42. A pressure sensor 44 is arranged to monitor the air pressure in the chamber 41 (closely related to the pressure of the air within the parison).

Figure 3:
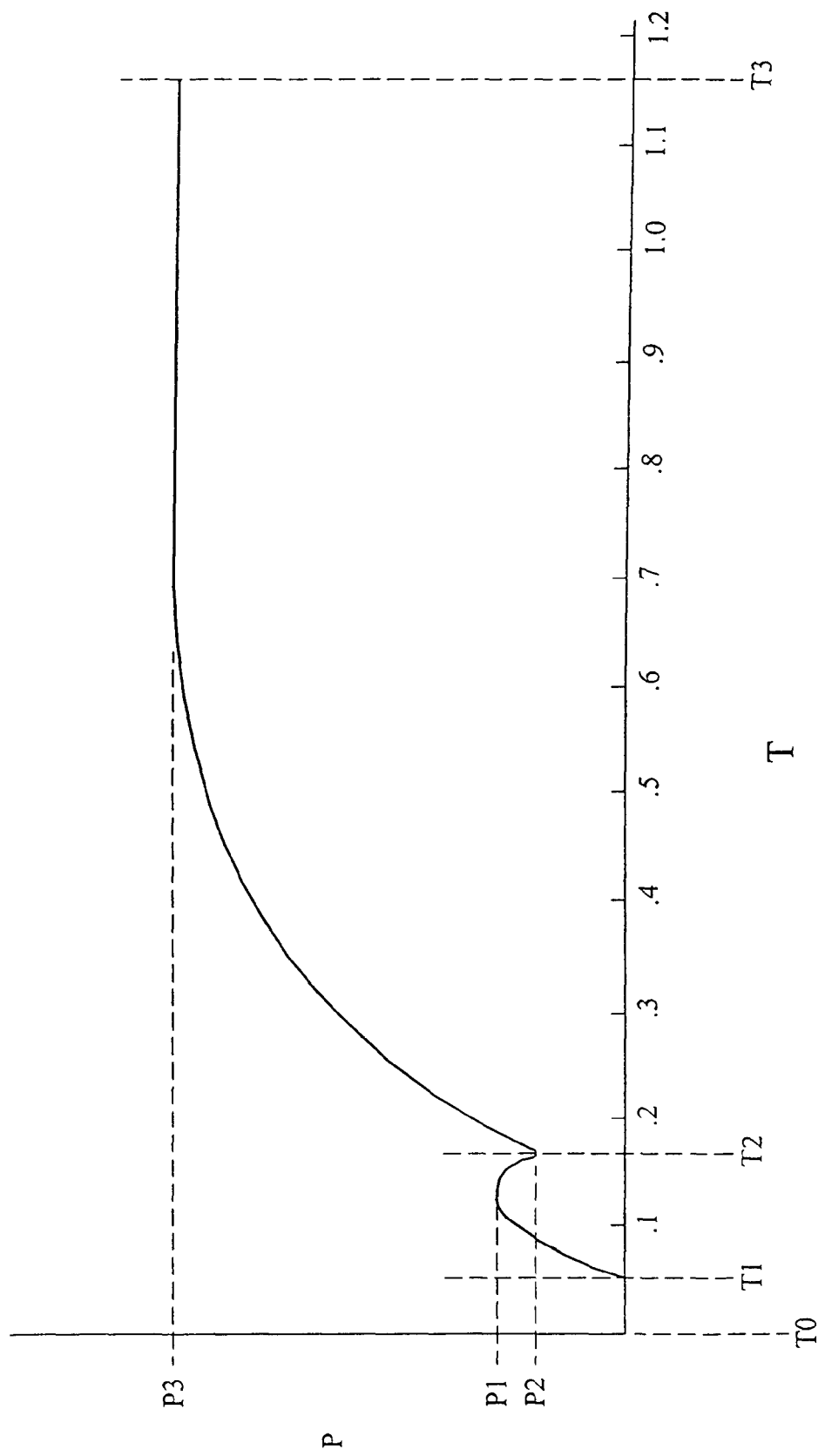
FIG. 3 shows a time versus pressure curve for the operating blow head.

FIG. 3 shows changes that have been discovered in the pressure P in the chamber 41 vs. time T plot. At about T1 seconds (0.05 seconds, for example) after the time T0 when blowing pressure is applied through the air inlet 34, the pressure in the chamber begins to rise. The pressure increases to an initial high P1 and drops to P2 (it is believed that this occurs as the parison rapidly expands). At T2 (0.15 seconds, for example) the parison is blown against the blow mold and the pressure once again increases until it reaches a steady state pressure P3 which continues until the blow head 18 is removed more than one second following the application of final blow. The pressure sensor 44 supplies data to the control C (26). While the curve has been discussed relative the blowing of the parison with pressure, it would be the same with vacuum assist or with the blowing of the parison with negative pressure (i.e., vacuum). Therefore, the terms "blow," "blowing," etc., used throughout the description and claims, are to be construed as encompassing such alternatives.

Figure 4:
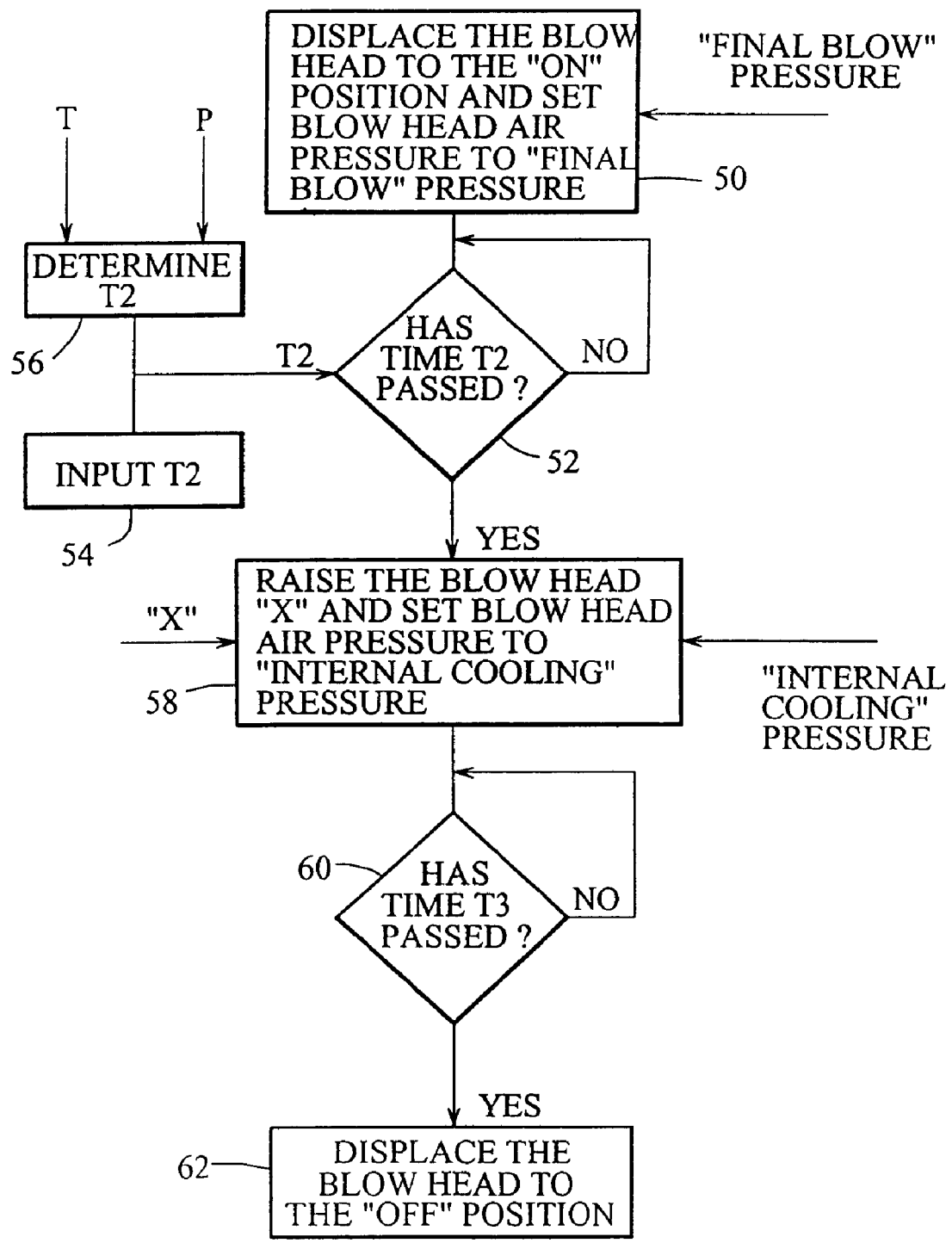
FIG. 4 shows a logic diagram for the operation of the blow head mechanism shown in FIG. 1.

Referring to FIG. 4, the control first functions to Displace The Blow Head To The "On" Position And Set Blow Head Air Pressure To "Final Blow" Pressure 50. "Final blow" pressure can be selectively set and is a pressure that will result in the parison being properly blown. Conventionally, "final blow" air is supplied from 20-30 PSI. Higher pressure will result in a defective bottle. Pressure is applied for a time T2 which is the time required to blow the parison (until the query "Has Time T2 Passed" 52 is answered in the affirmative). The operator may empirically define an Input T2 54.

Alternatively the control can "Determine T2" 56 by determining the location of the negative peak (a local minimum) at P2 (this negative peak may be slightly delayed from the instant when the bottle is fully blown and a correction could then be applied). In practice T2 could be periodically determined with the control receiving updated T2 input. The operator may also reduce T2 if he finds that the blowing of the parison will not be affected. With the parison blown, the control will "Raise The Blow Head "X" And Set Blow Head Air Pressure To "Internal Cooling" Pressure" 58 (distance "X" and "Internal Cooling" Pressure can be selectively set). This second "on" position is the escape position.

The cooling flow is no longer limited by the size of the blow head exhaust. The volume of cooling flow for the remaining second or more before the blow head is turned "off" will be very substantially increased. "Internal Cooling" air, can be supplied at a pressure which is substantially higher than final blow air. For example internal cooling air can be supplied at 45 PSI since this is a commonly available air supply. Internal cooling air will be supplied at a pressure sufficient to maintain at least a minimum desired pressure within the bottle. This cooling flow could continue until time T3 (until the query "Has Time T3 Passed?" 60) is answered in the affirmative, whereupon the control will "Displace The Blow Head To The "Off" Position" 62.

When the blow head is lifted the vertical distance "X" to the escape position (FIG. 5), exhaust air will be directed by the selectively concavely contoured annular recess surface 63 of the interior opening of the lower portion of the blow head to direct cooling air at the outer vertical surface of the finish.

Each blow head (FIG. 6) has a central axial hole 70 configured to matingly receive the blow tube 36. The blow tube is displaceable vertically but is restrained from rotating by a pair of guide keys 72 which engage opposed flats 74 (FIG. 7) on the outer diameter of the blow tube. The top end portion 76 of the blow tube is cylindrical and threaded, having an outer diameter larger then the spacing between opposed flats, and the keys accordingly function as a down stop for the blow tube. A blow tube support and drive assembly 78 is mounted on the top surface 79 of the blow head arm with a number of screws 80. The assembly has an air manifold 82 including a link 84 communicating with a final blow air duct 85 in the arm, an overhead distribution manifold 86, and three air distribution legs 88 which depend vertically from the overhead distribution manifold.

Located within each distribution leg is the top portion 90 of a drive member 92 having a threaded internal diameter 94 extending downwardly through the top portion, through a driven gear portion 96, and then through a lower portion 98 which extends downwardly through the blow head mounting assembly 100. The outside diameter of the drive member 92 is rotatably supported by three bearings 102. The internal thread of the drive member inside diameter threadedly receives the threaded top end portion 76 of the blow tube, and vertical displacement of the blow tube will accordingly result whenever the driven gear portion 96 is rotated. Rotation will be controlled by an electronic motor 104 coupled to a drive gear 106. The drive gear engages adjacent driven gear portions of the left two driven gear portions to drive the left two drive members 92, and an idler gear 108 between the right hand pair of driven gear portions 96 drives the right hand drive member.

Figure 8:
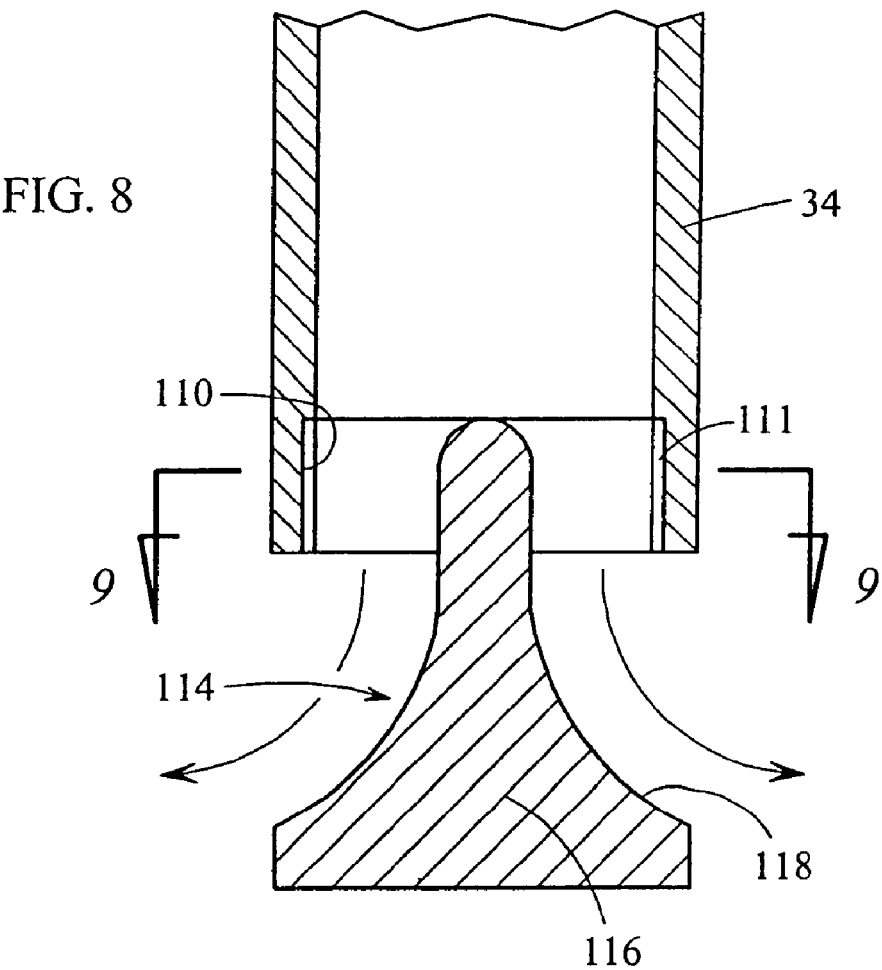
FIG. 8 is an elevational sectional view of the bottom of the cooling tube.
Figure 9:
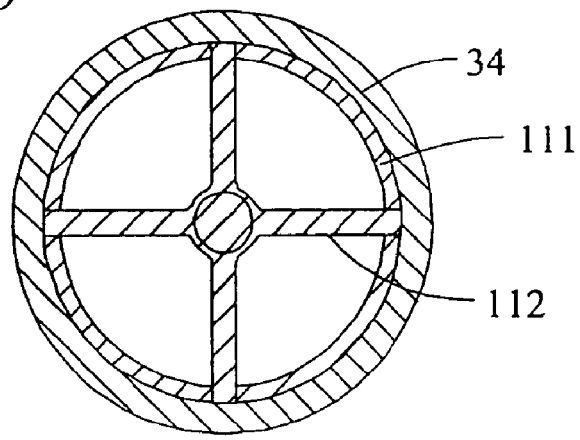
FIG. 9 is a view taken at 9-9 of FIG. 8.

The bottom of the blow tube 36 (FIG. 8) has an annular relief 110 defined in the I.D. An annular upper collar 111 (which is supported by an "X" frame 112—see FIG. 9) of an air deflector assembly 114, is press fit into the annular relief. Integral with and suspended from the frame 112 is a deflector 116 having an annular concave surface 118 that will divert a portion of the downwardly directed air stream radially outwardly towards the outer wall of the blown parison with the remainder flowing downwardly. FIG. 6 shows the blown parison which when cooled becomes a bottle 10, and also shows the blow mold 12 which includes a bottom plate 12c and a pair of mold halves 12a, 12b.

Figure 10:
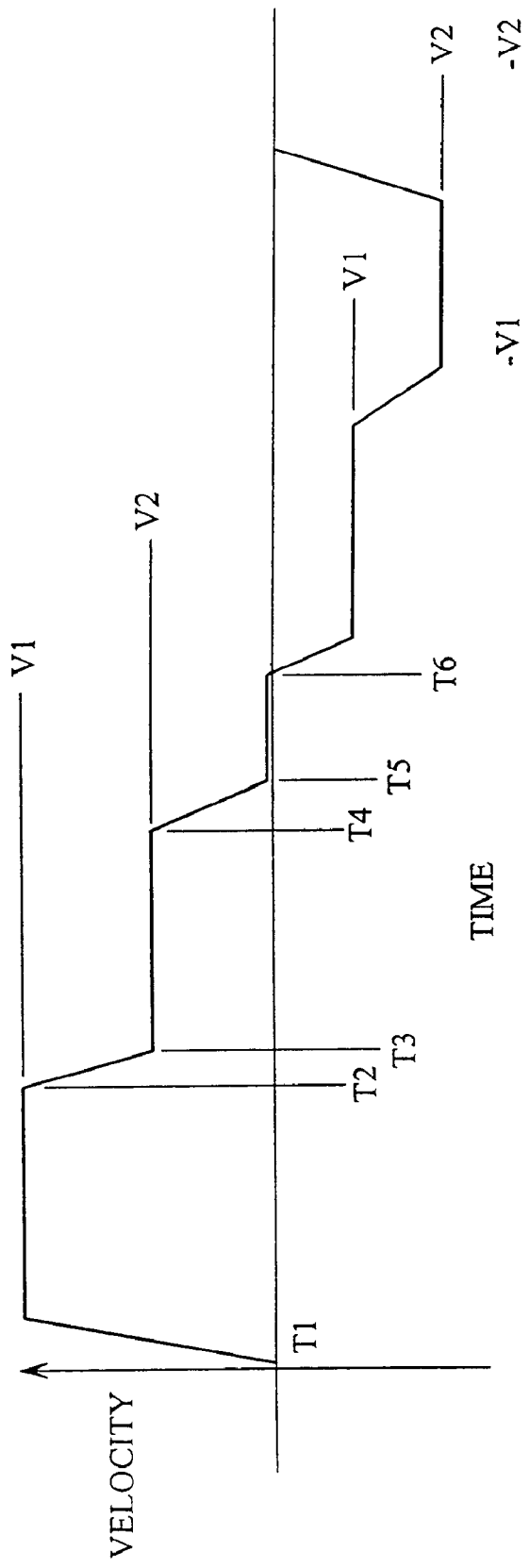
FIG. 10 is a first displacement profile illustrating the vertical displacement of the cooling tube during the blowing and cooling of the parison to form a bottle.

FIG. 10 illustrates an illustrative displacement profile for the blow tube which will blow and cool the parison. The blow head is displaced to the "on" position with the blow tube at the "up" position (T1). The blow tube is then rapidly accelerated to a maximum velocity (V1) and held at that velocity until T2. The blow tube is then decelerated to a lower velocity V2 at T3 and held at that velocity until T4, when it is decelerated to a stop at its "down" position (T5). The blow tube will then remain at the "down" position until T6. The blow tube will then follow the same profile, returning the blow tube to a stop at the "up" position. The blow head can then be removed and the mold opened.

The displacement profile will be selected to achieve the desired cooling of the inner surface of the blown parison, i.e., the motion profile is configured to coordinate with the cooling requirements of the bottle or other container. This coordination can be a coordination based on the heat times the mass of the bottle. As shown in FIG. 6, the bottle has a long neck which has less glass to cool then the body of the bottle, and if the bottle was formed in a blow and blow process, the body of the bottle will be hotter relative to the long neck. As a result, the velocity of the blow tube as it proceeds along the neck portion is coordinated with the heat pattern of the bottle (the amount of heat energy desired to be removed along the bottle) and is much faster traversing the long neck than is the velocity traversing the body. Accordingly, more cooling will be directed to the body where it is needed. Where the bottom of the formed parison is thicker, even more cooling will be required and the dwell (T6-T5) at the bottom will result in a lot of cooling air being directed at the bottom. Cooling air will continue to rise up along the body and neck to achieve additional cooling when the blow tube is at the bottom (this will also happen at any vertical position).

Figure 11:
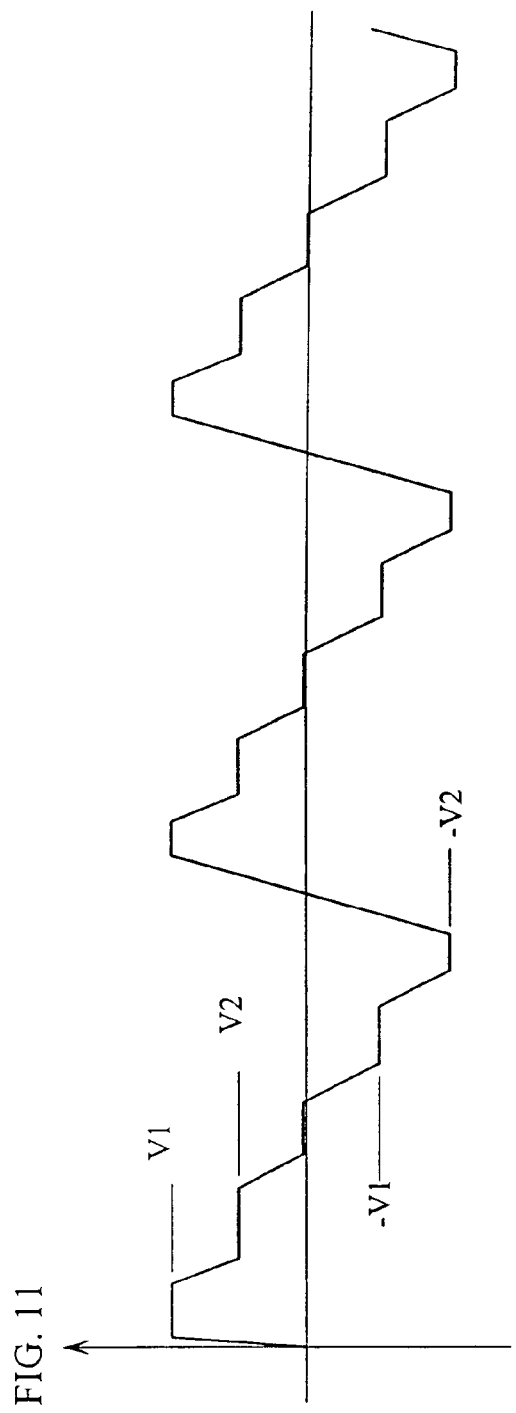
FIG. 11 is a second displacement profile illustrating the vertical displacement of the cooling tube during the blowing of the parison and the cooling of the parison to form a bottle.

FIG. 11 illustrates a variant displacement profile where the blow tube makes three cycles while the parison is blown and cooled. This coordination could also be a function of the shape of the bottle. For example, the bottle might have a bulge which would not be effectively cooled by cooling air flowing upwardly from a nozzle located below the bulge. In this situation, like the above cooling of a thicker base, the displacement of the cooling nozzle might be either stopped at this bulge to allow more cooling air to be directed into the bulge or slowed down as it displaced upwardly across the bulge to the same effect. The forming process will also be relevant to this coordination. Thickness of the glass as a function of height may vary. In a blow and blow process, the upper portion of a bottle or other container will tend to be colder than the bottom portion and vice versa for a bottle formed in a press and blow process.

Figure 12:
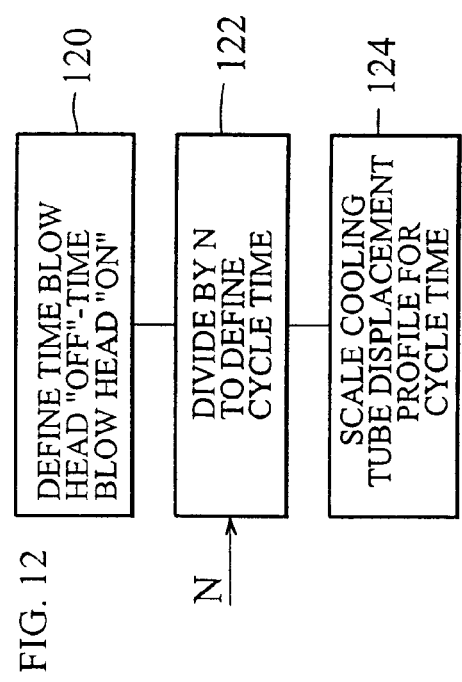
FIG. 12 is a logic diagram illustrating the application of the displacement profile illustrated in FIGS. 10 and 11.

FIG. 12 illustrates a logic diagram for controlling the displacement with different cycles during the time when a parison is blown and cooled. Here the operator inputs the number "N" of cycles desired. The control will Define Time Blow Head "Off"–Time Blow Head "On" 120, proceeds to Divide By "N" To Define Cycle Time 122, and then proceeds to Scale Blow Tube Displacement Profile For Cycle Time 124.

While the blown parison/formed bottle is in the blow mold external cooling will be effected by blowing cooling air through a series of circumferentially located cooling holes 19 (FIG. 6) defined in the blow mold which are supplied by an air plenum 21 to which the mold bottom plate 12c is secured.

Figure 13:
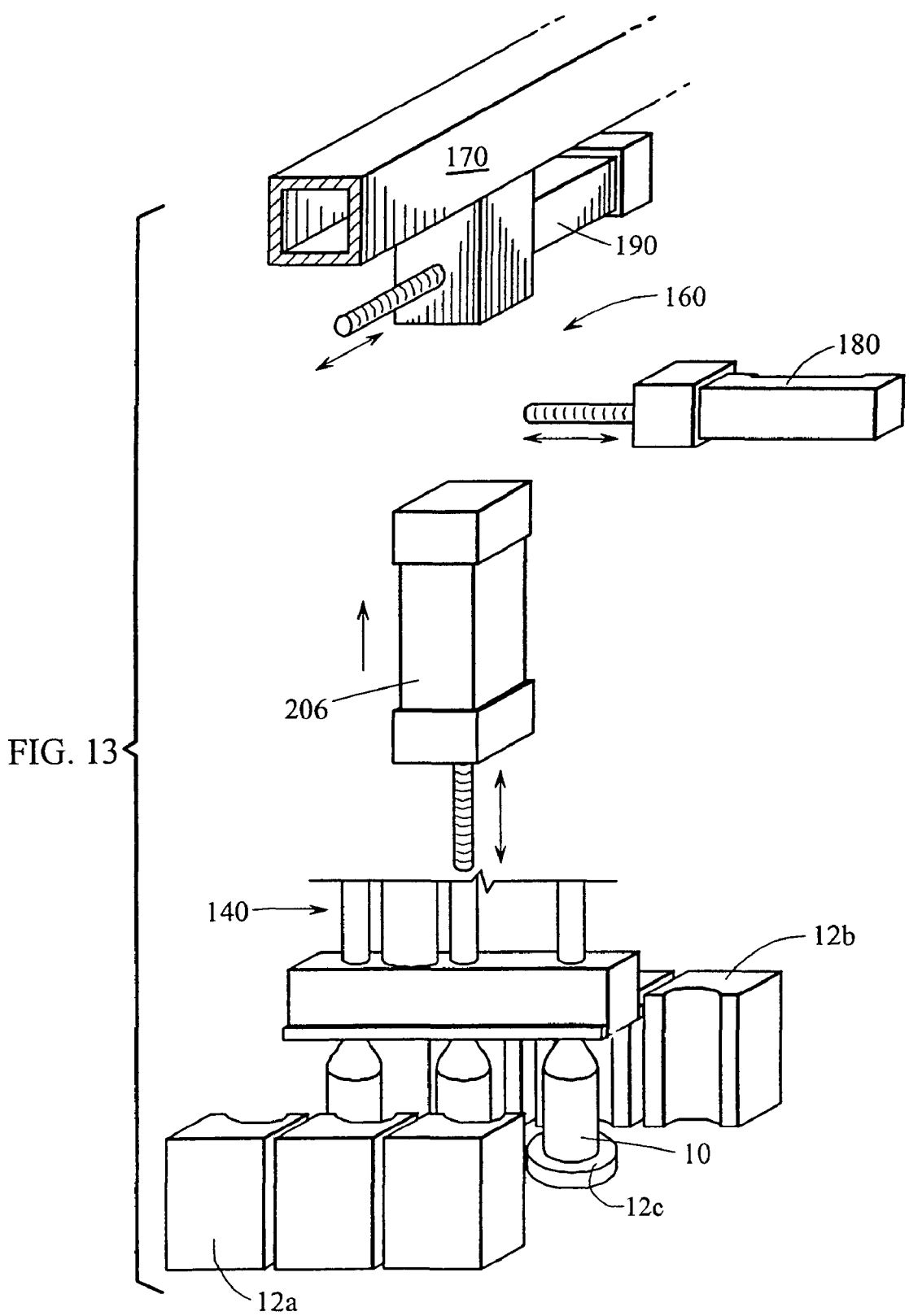
FIG. 13 shows a perspective view of a takeout mechanism made in accordance with the teachings of the present invention.

A takeout mechanism is schematically illustrated in FIG. 13. Three bottles 10 which were formed in blow molds at the blow station are shown standing on the bottom plate 12c of an associated pair of blow mold halves 12a, 12b shown in the open position. The illustrated machine is a triple gob machine and accordingly three bottles 10 were formed. Once the molds are opened, a takeout assembly 140 of a takeout mechanism 150 grips the bottles. The takeout mechanism also includes a three axis support 160 for the takeout assembly that is suspended from a beam 170 that traverses the machine, i.e., spans the 6, 8, 10, 12, 16, etc., individual sections of the machine. The three axis support, which includes an X axis drive 180, a Y axis drive 190, and a Z axis drive 200, can take a great variety of forms, including the form shown in U.S. Pat. No. 4,892,183, to Fenton, which is assigned to the Assignee of the present patent application and which is hereby incorporated by reference herein.

Figure 14:
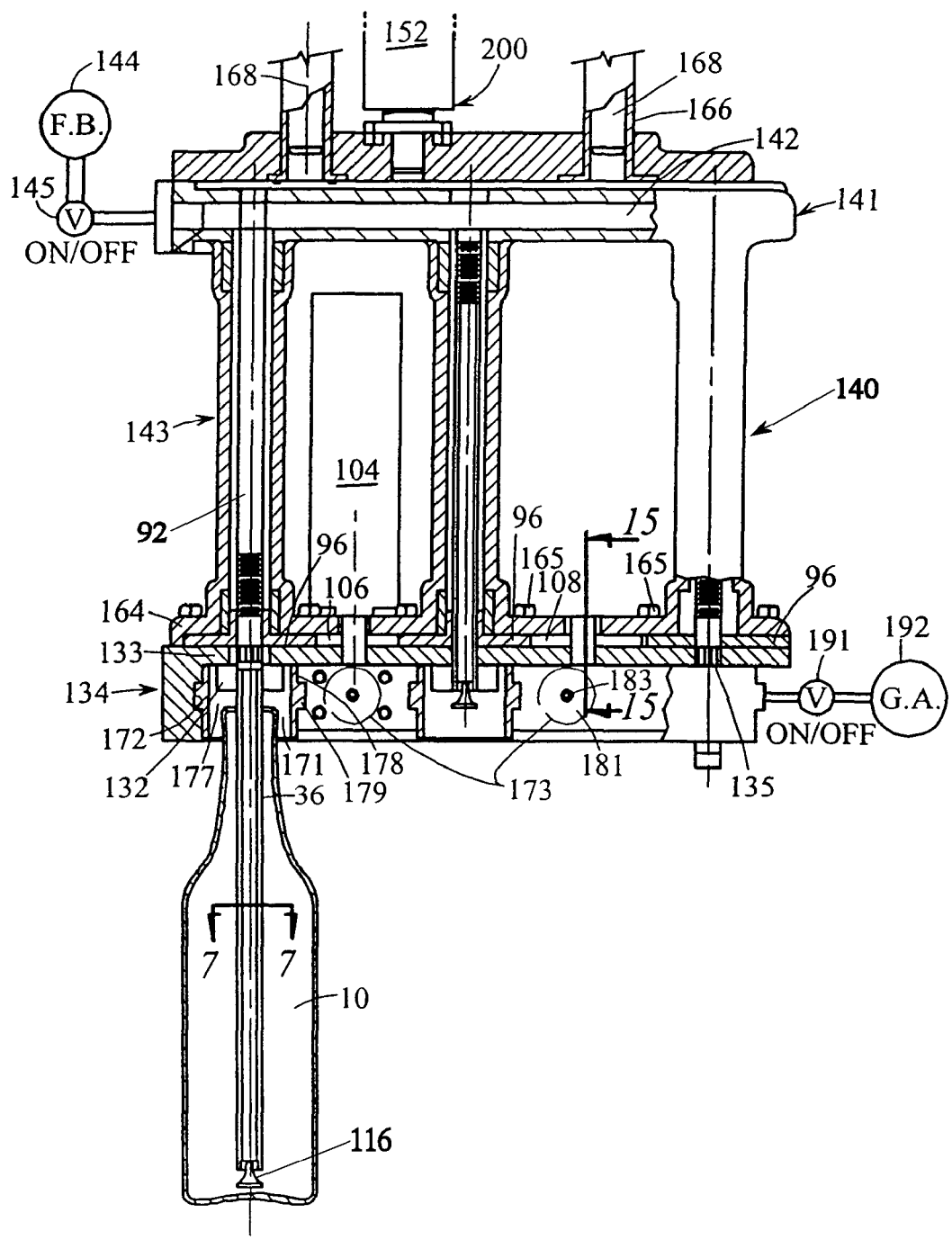
FIG. 14 shows an elevational view in section of the takeout mechanism shown in FIG. 13.

The takeout assembly has, at each bottle location, a blow tube 36 (FIG. 14). The blow tube support and drive assembly is the same as for the blow head mechanism, except that the drive members 92 end at the driven gear portion and the guide keys 132 extend downwardly from the top wall 133 of the gripper housing 134 proximate the blow tube holes 135.

The takeout assembly also has a manifold housing 141 including an overhead distribution manifold 142 and three air distribution legs 143 which depend vertically from the overhead distribution manifold. Final blow (this includes air for final blow and/or internal cooling depending on how the parison is being formed) air F.B./144 is supplied to the distribution manifold via a selectively controlled valve 145.

The base 164 of the manifold housing 141 is bolted onto the top wall 33 of the gripper housing 134 with a number of screws 165 with the driven gear portions 96, the drive gear 106, and the idler 108 located in a chamber located between the base of the manifold housing and the top wall of the gripper housing. The manifold housing has a pair of guide tubes 166 extending vertically upwardly from the top of the manifold housing which receive vertical guide rods 168 which are part of the Z axis drive 20.

Figure 15:
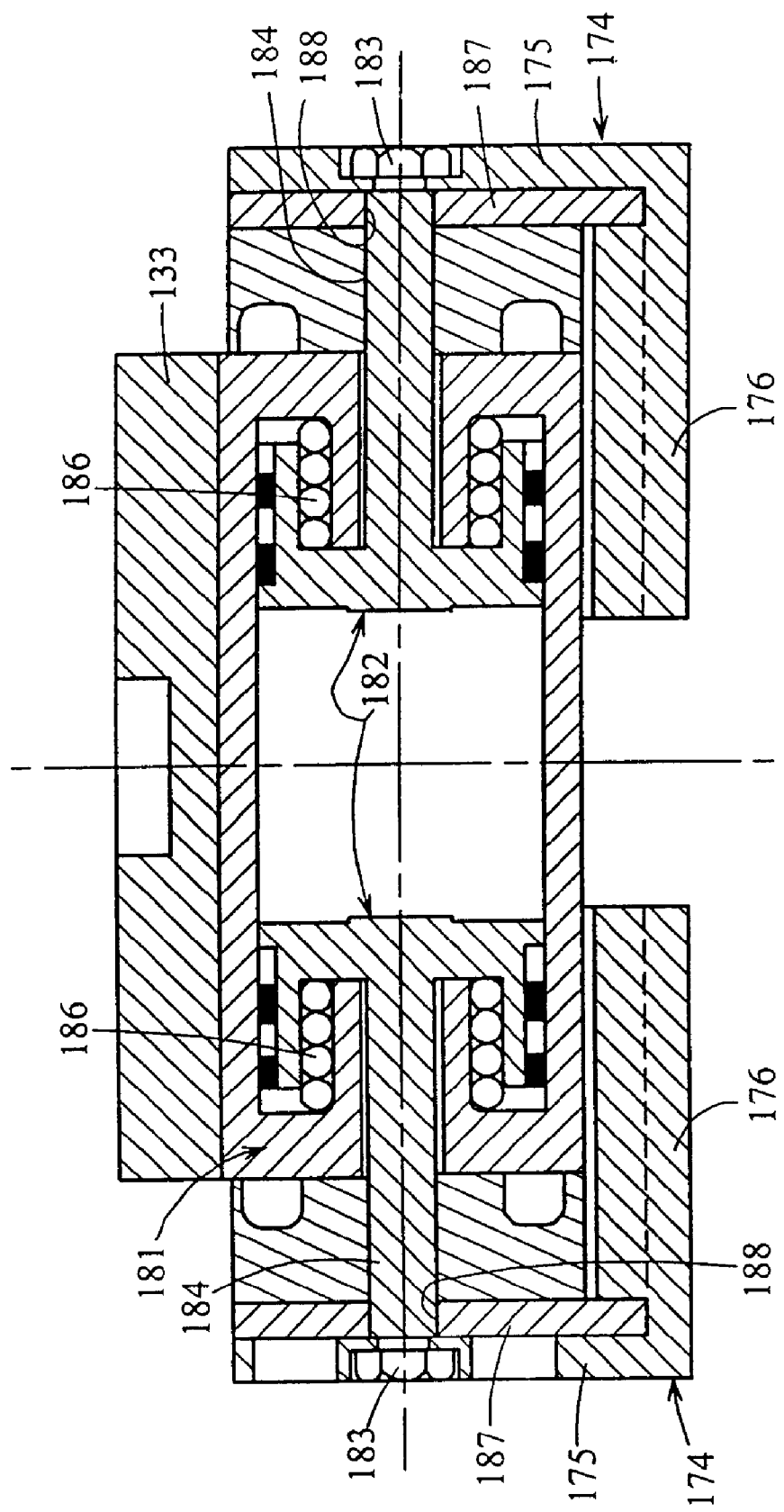
FIG. 15 is a view taken at 15-15 of FIG. 14.
Figure 22:
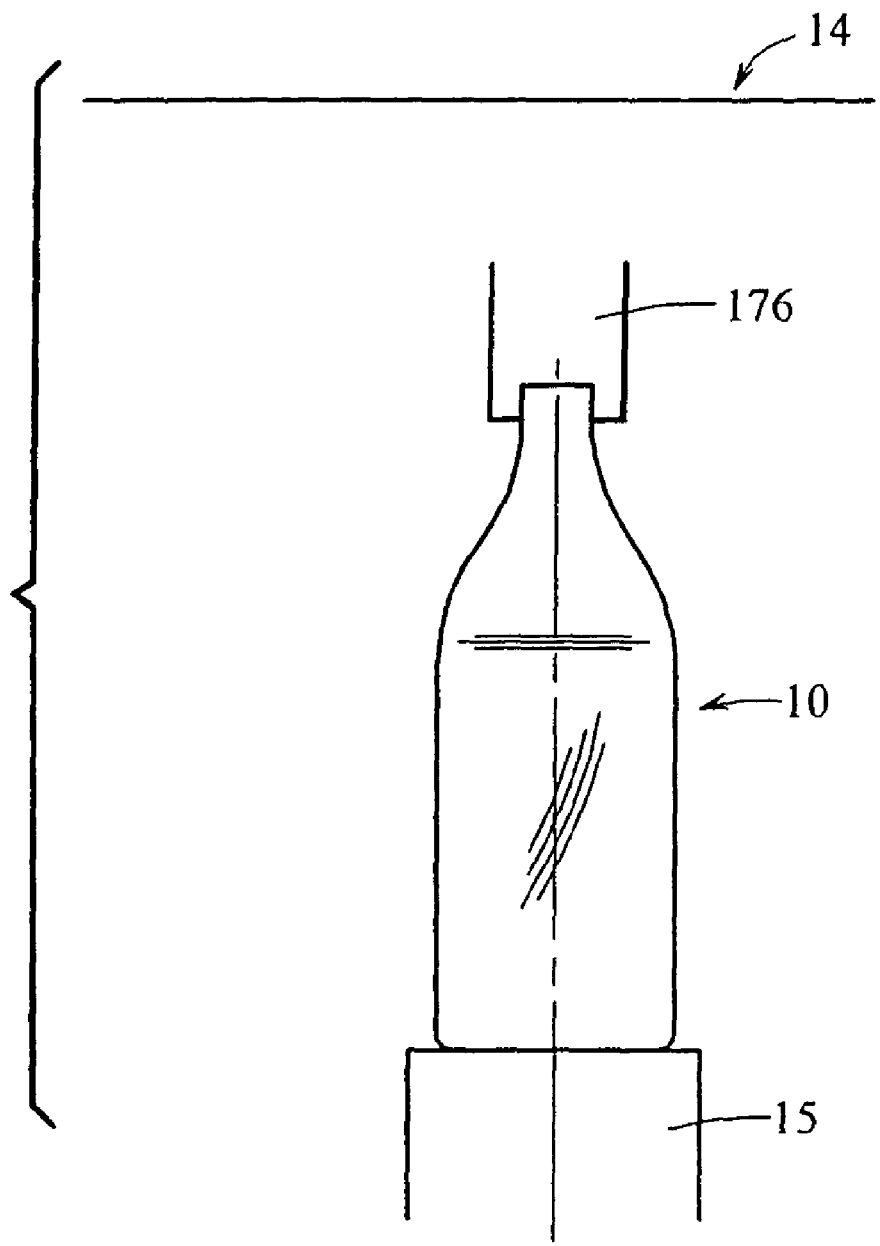
FIG. 22 is a view taken at 22-22 of FIG. 21.
Figure 25:
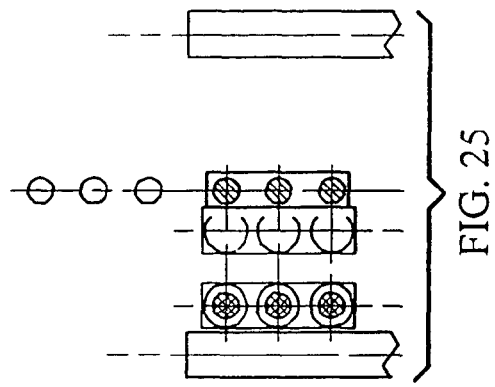
FIGS. 23 through 28 illustrate the synchronism of a pair of takeout assemblies with their associated deadplate mechanisms.
Figure 28:
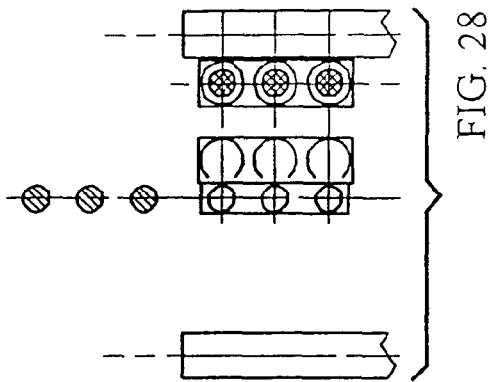
Figure 24:
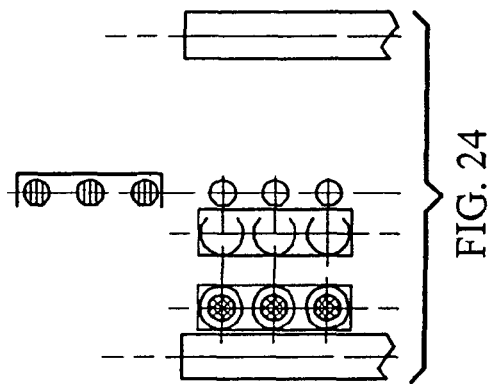
Figure 27:
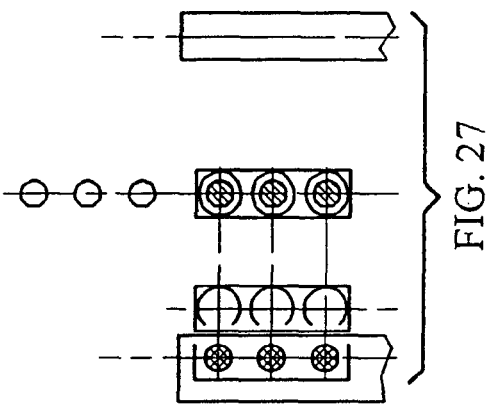
Figure 23:
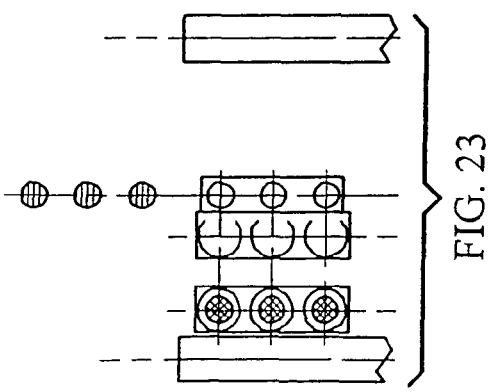
Figure 26:
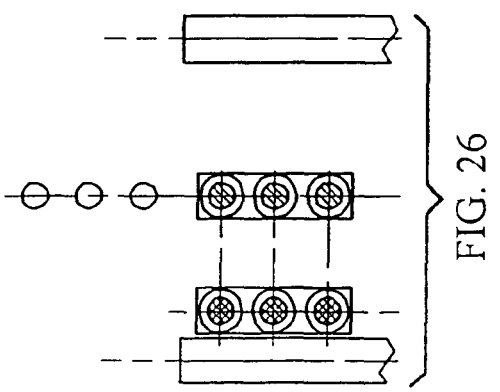

As can be seen from FIG. 14, the gripper housing may start as a solid block. A through slot 171 having opposed horizontal keyways 172 is defined at each bottle location extending from the front of the gripper housing to the rear thereof. These slots receive front and back gripper brackets 174 (FIG. 15), each of which has integral vertical front 175 and horizontal bottom 176 panels extending completely across the gripper housing and vertical transverse (front to back) panels 178 which include horizontal keys 179 which are received by the keyways 172. The vertical front panels 175 are open 177 between the vertical transverse panels to allow easy flow of the air from the interior of the bottle to atmosphere.

Secured within each of a pair of through holes 173 which extend through the gripper housing from the front to the back of the housing is a double acting cylinder 181 including opposed piston and rod assemblies 182. A pair of screws 183 connect each gripper bar to the piston rods 184 on the side of the gripper bar and compression springs 186, located between the piston and the cylinder housing will normally maintain the gripper bars at the closed position. A locating plate 187 is secured to the front panel of the gripper bracket with a rod receiving hole 188 to locate the axis of the rod. Air under pressure is supplied via a valve 191 from a source of gripper air G.A./192 to the center of each cylinder to open the gripper bars. The gripper bars may have selectively sized semicircular inserts (not shown) so that the closed gripper bars will grip the formed bottles on the finish of the bottles.

FIGS. 16 through 22 schematically illustrate how three bottles that have just been formed in the blow station of a triple gob I.S. machine standing ready for pick-up (with the blow molds withdrawn) are sequentially processed by a takeout arm or assembly. The takeout assembly will remove bottles from the blow station at a first or pickup position and deposit them on a conveyor 15 which extends parallel to the center line of the blow molds defined by the adjacent faces of the opposed pairs of blow mold halves when the molds are closed. The bottles will then be conveyed into a cooling tunnel 17 (the tunnel will isolate the hot air from an operator who may have to enter the space between the conveyors to service either the conveyor or the machine).

The takeout assembly 140 is shown in FIG. 16 at an initial deadplate position. Bottles 10 (shown cross hatched) have been formed in the blow molds 12 at the blow station 11. The molds 12 open and the takeout assembly moves longitudinally to the first pickup position shown in FIG. 17 where the formed bottles will be gripped. The gripped bottles will be removed from the first pickup position and carried back to the initial deadplate position (FIG. 18). In the event that the bottles are to be rejected, the gripper jaws can be opened at the second deadplate position to drop the rejected bottles into a cullet removal chute 13.

The gripped bottles, removed from the blow station, if not rejected, are supported next to open doorways or openings in associated enclosures comprising cooling chambers or canisters, termed cans 220 (this open condition being represented automatically by open semicircles) which are supported on a deadplate mechanism 240 which is at its park position in FIGS. 16 through 18. The deadplate mechanism now moves horizontally, transversely towards the gripped bottles to the second deadplate position (until the gripped bottles are supported centrally within their associated cooling can) and the doors of the cooling cans are then closed (this is shown schematically by each cooling can 220 being a closed circle in FIG. 19.

The takeout assembly 140 and the deadplate mechanism 240 then conjointly horizontally transversely move to a third or conveyor location adjacent a first, right side conveyor 15 (FIG. 20), the cooling can doors open and the takeout assembly then moves transversely away from the deadplate mechanism 240 to a fourth position located over the conveyer (FIG. 21) and then vertically downwardly from the up position to the down, deposit position (FIG. 22) to place the gripped bottles on the conveyor whereupon they will be released The takeout assembly is then returned to the up position and the deadplate mechanism and the takeout assembly will then be conjointly transversely displaced back to their initial positions shown in FIG. 16. Again the takeout assembly can be displaced with sequential or simultaneous x and y movements. When molds are to be changed, the deadplate mechanism (or both deadplate mechanisms as discussed later with reference to FIGS. 23 through 28) can be displaced to the conveyor position to open up space for the operator.

With the first batch of bottles (Bottles No. 1) removed from the blow station (FIG. 18), an invert mechanism (not shown) will deliver formed parisons to the blow station and the blow molds will close. The parisons will be blown and cooled so as to form bottles (FIG. 19) and the molds will open so that the sequentially formed bottles (Bottles No. 2) can be removed (FIG. 20) by a second takeout assembly. This forming process will be repeated with the next formed bottles (Bottles No. 3) being removed by the first takeout assembly. The synchronous movements of the first takeout assembly and its associated deadplate mechanism and the second takeout assembly and its associated deadplate mechanism are illustrated in FIGS. 23 through 28.

During the time when the first takeout assembly 140 is at the initial or second deadplate position (FIG. 23), is displaced to the first pickup position (FIG. 24) to grip the bottles, returns with the gripped bottles to the second deadplate position (FIG. 25), and waits for the first deadplate mechanism to move to the second deadplate position to capture the bottles and close the cooling can doors (FIG. 26), the second takeout assembly 140' and second deadplate mechanism 240' are located at the conveyor location adjacent a second, left side conveyor 15' with bottles formed in the previous cycle located within the cans with the can doors closed.

Before the first takeout assembly and first deadplate mechanism are displaced conjointly to the third conveyor location adjacent the first conveyor (FIG. 27), the doors to the cans of the second deadplate mechanism 240' open and the second takeout assembly 140' is transversely displaced to displace the gripped bottles to the fourth deposit position over the second conveyor 15', whereupon the second takeout assembly 140' is lowered from the up deposit location to a down deposit location to locate the gripped bottles proximate the second conveyor 15'. The gripped bottles are released and the second takeout assembly is raised to the up deposit location. As the first takeout assembly 140 and first deadplate mechanism 240 are displaced from the second deadplate position to the third conveyor position proximate the first conveyor 15, the second takeout assembly 140' and second deadplate mechanism 240' are conjointly displaced to their start positions (FIG. 28) to start their cycle again, removing the next bottles (Bottles No. 2) formed in the blow station.

The basic cycle now repeats with the roles reversed for the first takeout assembly/deadplate mechanisms and the second takeout assembly/deadplate mechanism with the first takeout assembly/deadplate assembly returning to their start locations to receive the next formed bottles (Bottles No. 3). While the displacement of the takeout arm from the conveyor position to the pick up position is shown with sequential X and Y movements, it should be understood that such movements could occur simultaneously.

Figure 29:
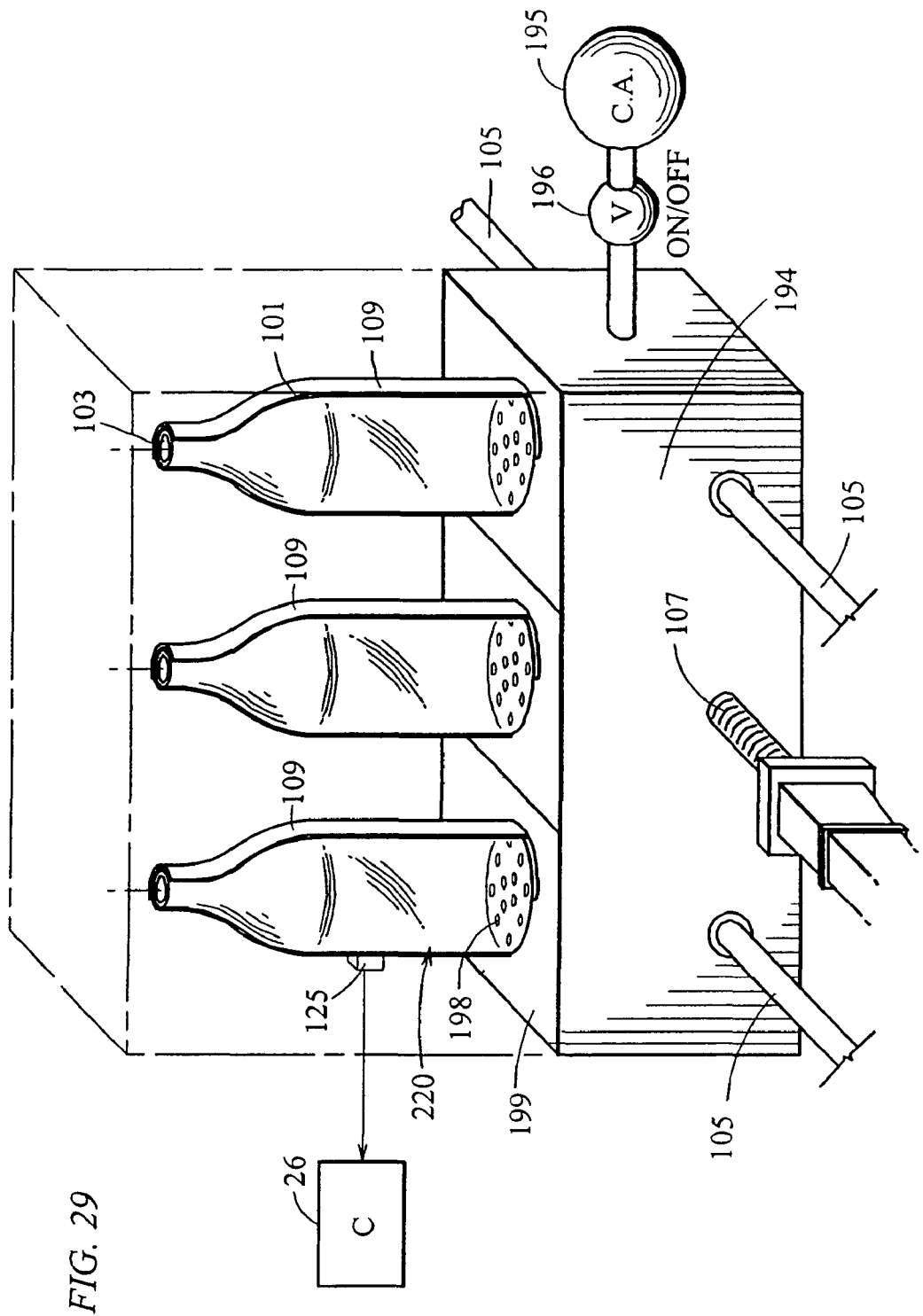
FIG. 29 is an oblique view of a the deadplate mechanism shown in FIGS. 16 through 21.
Figure 30:
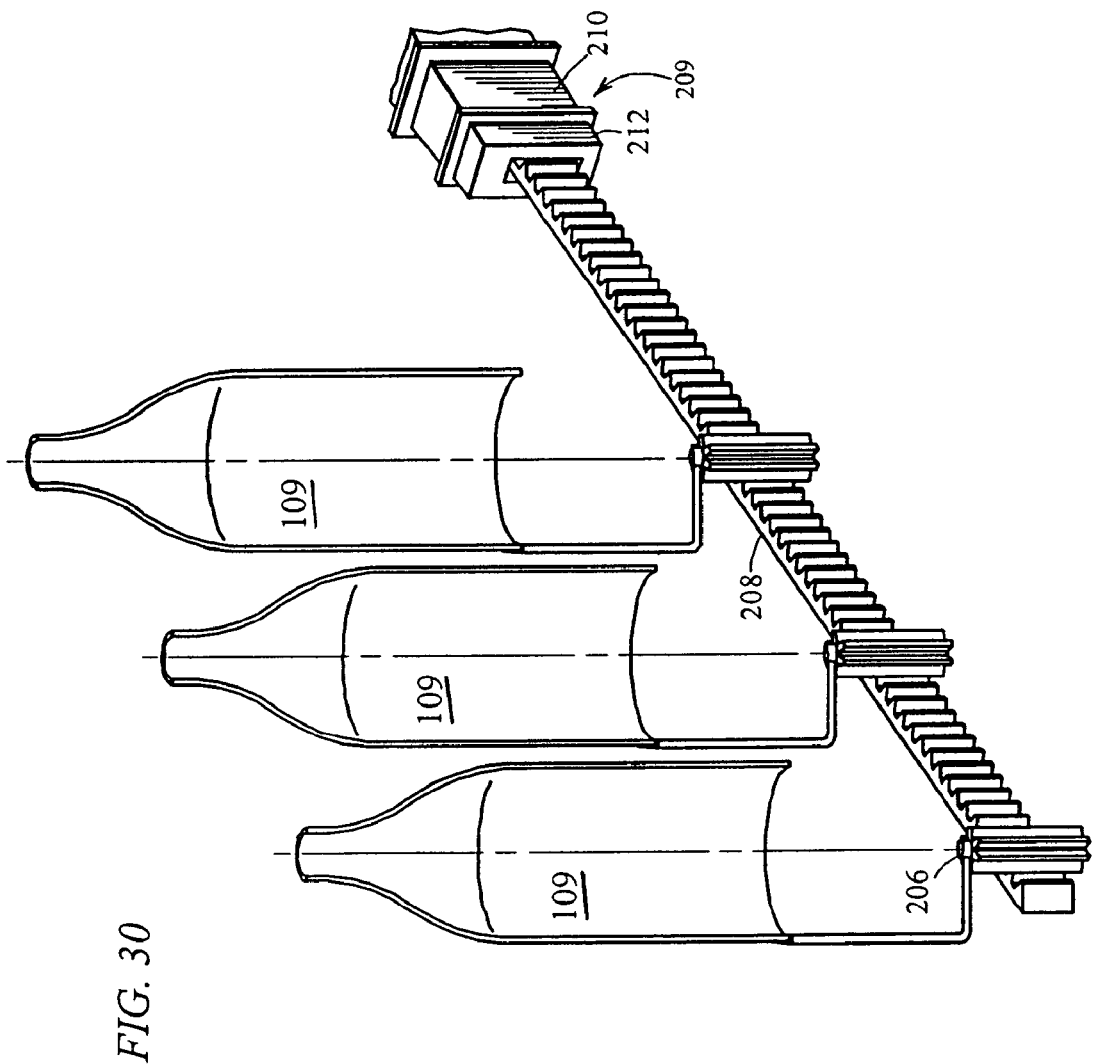
FIG. 30 is an oblique view of the mechanism for opening and closing the can doors.

FIGS. 29 and 30 illustrate a deadplate mechanism which has a plenum chamber 194 which is supplied with cooling air C.A./195 controlled by a selectively actuated valve V/196. Cooling air is available throughout the entire period during which a bottle is located within a can 220, and for longer periods to cool the can either before or after a bottle is located within the can. Cooling air enters the cans 220 through holes 198 in the top surface 199 of the plenum chamber, blowing up against the bottom of a bottle supported above the top surface by a takeout assembly and up the space between the suspended bottle and the inside wall 101 of the can, leaving the can through the can opening 103 at the top of the can. The plenum chamber is supported for Y axis displacement by suitable rods 105 and is displaced by a Y axis drive 107. FIG. 30 schematically illustrates the door displacement mechanism for the deadplate mechanism cans. The doors 109 are coaxially mounted on a gear (a worm gear for example) 206 which is supported for rotation about its axis. Operatively connected with each gear is a further worm (for example) 208 which is displaced by a drive 209 having a motor 210 connected to the worm via a rotary to linear converter 212 (alternates such as rack and pinions may be used).

The interior surface of a can is configured so that cooling air admitted into the can through the bottom inlet holes 198 in the top surface of the plenum chamber will follow the surface of the bottle during its passage to the exit hole 103. Air flow to a can will occur as desired to achieve the cooling of the bottle, but in the preferred embodiment air flow is continuous from the time a bottle enters a can to the time a bottle leaves the can.

Figure 31:
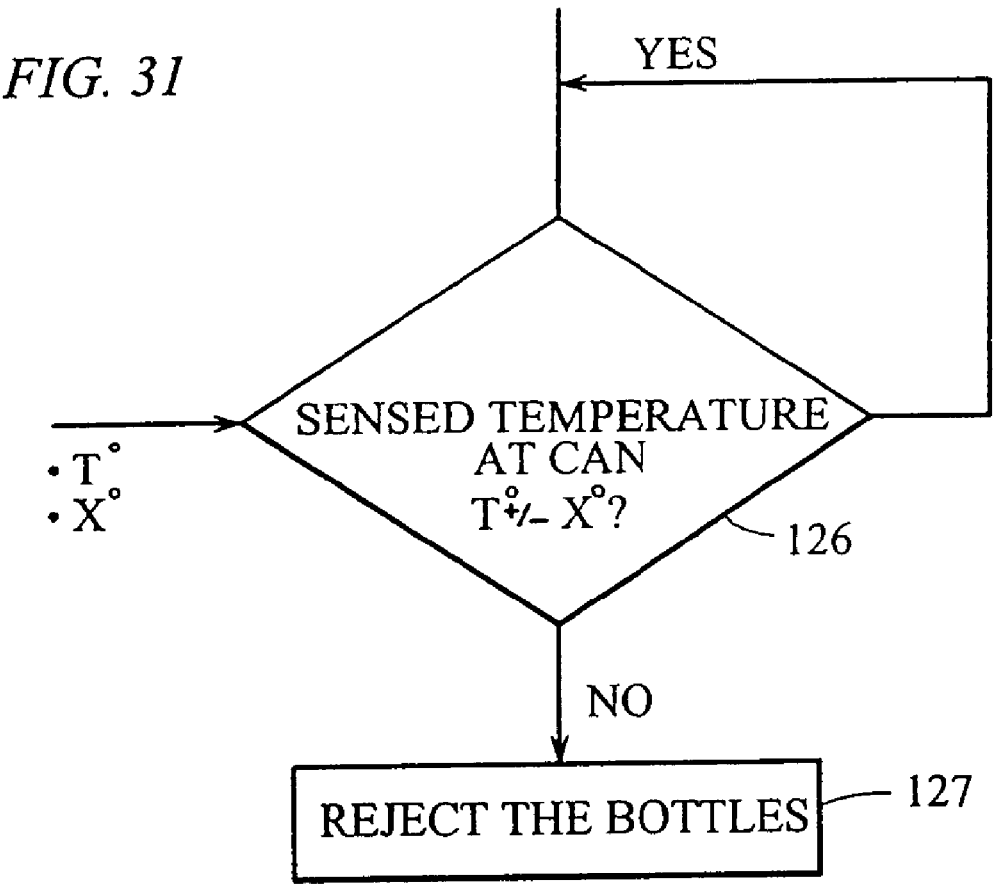
FIG. 31 is a logic diagram illustrating the operation of the temperature sensor.

A temperature sensor 125 secured to one or more of the cans provides temperature data which should be stable over time (data would be compared at the same point in the cycle). With reference to FIG. 31, the control C/26 which receives this data determines whether "Sensed Temperature At Can T°+/−X° " 126 (T and X can be manually or automatically inputted) and where the answer is answered in the negative, the control will "Reject The Bottles" 127. Where the cullet chute is located in the center, the deadplate mechanism can be displaced back to its ready position, the doors of the can may be opened, the takeout can be displaced to a position over the cullet chute and the bottles can be released.

The blow tube will be oscillated between the up and down positions with a displacement profile matched to the cooling requirements of the bottle from the moment the takeout assembly is lowered to its bottle gripping position until the gripped bottle is deposited onto the conveyor. As with the blow head a convenient algorithm for defining this oscillation is shown in FIG. 12 and numerous cycles will occur while the bottle is gripped by a takeout assembly.

Figure 32:
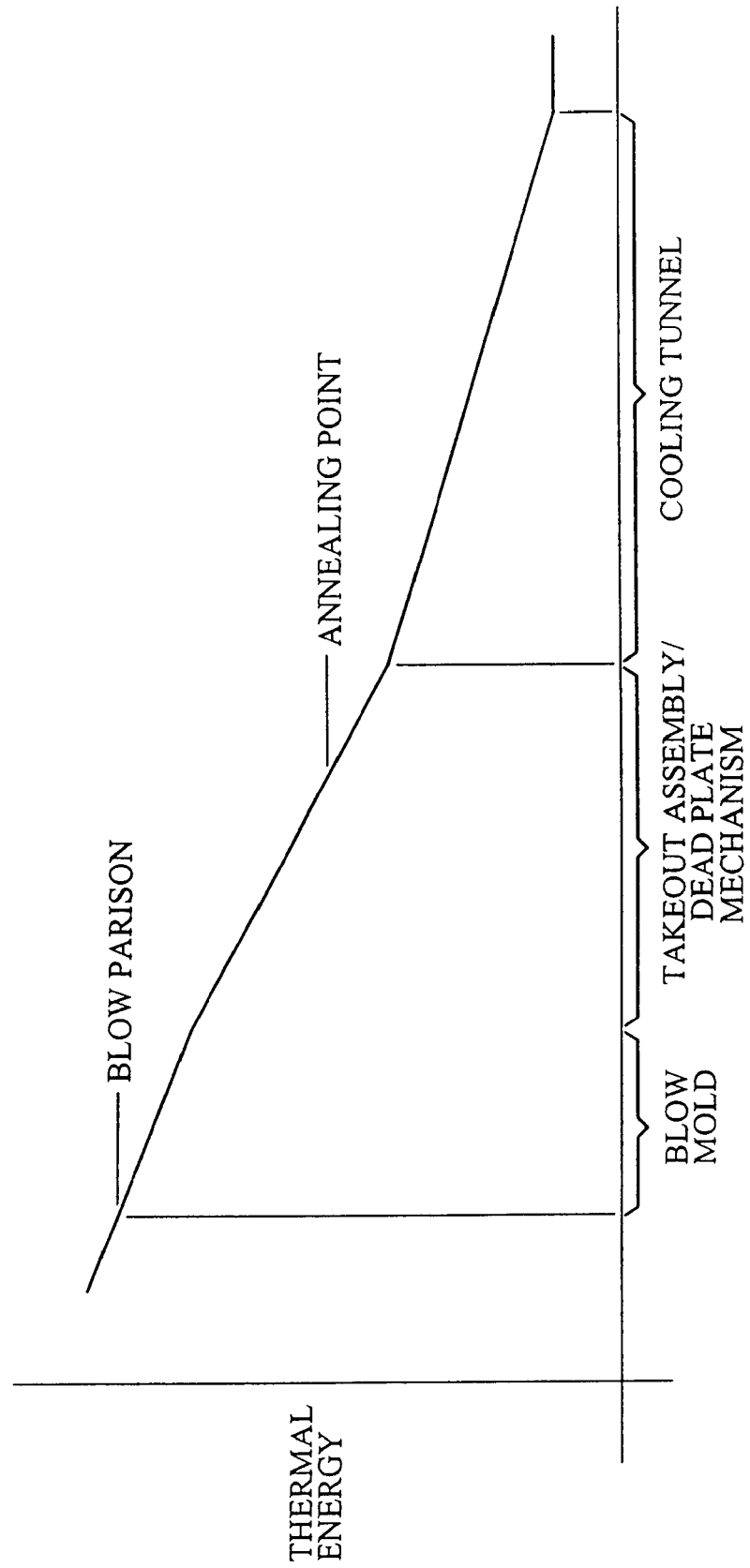
FIG. 32 is a temperature vs. position curve for the formed bottle.

Referring to FIG. 32, which tracks the thermal energy of the object along the glass forming process, it can be seen that the thermal energy continuously decreases from the time the parison is blown in the blow mold to the time the bottle is discharged from the cooling tunnel. Thermal energy is first removed by the internal cooling of the blown parison within the blow mold and the conjoint cooling of the blown parison by the blow molds. Cooling then continues from the time a bottle is gripped by a takeout assembly to the time it is deposited on a conveyor and then cooling occurs as the bottle proceeds along the conveyor.

As can be seen from FIG. 32, the thermal energy of the bottle has been reduced to the point where the bottle is fully tempered before it is deposited on the conveyor, and accordingly further cooling can take place at a rapid rate without causing defects in the bottle. Referring to FIG. 16, conveyor cooling which may be within a tunnel or not. Cooling would continue for a distance that would be much shorter than the length of a conventional Lehr, perhaps as short as about 25 feet. If it is within a tunnel, the tunnel may be divided up into a number of cooling zones each of which has a fan F/300 which supplies shop air to an inlet 302 within the tunnel directing the air upstream. Upstream of the inlet is an exhaust 304 which discharges the cooling air from the tunnel. If there is no tunnel, the fans will simply blow cooling air at the bottles. When the bottles are sufficiently cooled they will be discharged from the conveyor for further processing which could include inspection and packing or filling.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method of operating a blow head mechanism, the blow head mechanism including support means for supporting a blow head assembly, a blow tube selectively displaceable between an up position and a down position, and displacement means for displacing the blow head assembly and the blow tube, the method comprising:
   displacing the blow head assembly between a remote "off" position and an advanced "on" position;
   displacing the blow tube from its up position down to its down position and then back up to its up position;
   displacing the support means by first displacement means to displace the blow head assembly between its remote "off" position and its advanced "on" position;
   displacing the blow tube by second displacement means including a profiled displacement actuator; and
   controlling the profiled displacement actuator in accordance with a displacement profile so as to displace the blow tube from its up position down to its down position and then back up to its up position a plurality of times during the time that the blow head assembly is at its "on" position.

2. The method according to claim 1, further comprising blowing a parison in a blow mold of an I.S. machine, displacing the blow tube between its up and down positions a plurality of times to cool the blown parison, and removing the formed container from the blow mold.

3. The method according to claim 2, further comprising:
   blowing a parison having an upper neck portion and a lower body portion; and
   controlling the profiled displacement actuator in accordance with the displacement profile so as to displace the blow tube from its up position to the location where the upper neck portion meets the lower body portion at an average velocity higher than the average velocity at which the blow tube is displaced from the location where the upper neck portion meets the lower body portion to its down position at the bottom of the container.

4. The method according to claim 3, further comprising:
   maintaining the blow tube proximate the bottom of the container for a selected period of time.

5. The method according to claim 4, further comprising:
   controlling the profiled displacement actuator in accordance with the displacement profile to displace the blow tube from its down position to the location where the upper neck portion meets the lower body portion at a first average velocity; and
   displacing the blow tube from the location where the upper neck portion meets the lower body portion to its up position at a second average velocity;
wherein the second average velocity is greater than said first average velocity.

6. A method of operating a blow head mechanism, comprising:
- supporting a blow head from a support element with the blow head being located above a blow mold;
- displacing the blow head between an "off" position wherein the blow head is located above and displaced from the blow mold and an "on" position wherein the blow head is located on the blow mold which is closed with a parison supported therein;
- when the blow head is on top of the closed blow mold, supplying the blow head with pressurized air to form the parison into a bottle and, following bottle formation, to cool the interior surface of the formed bottle prior to the blow mold being opened and the bottle removed therefrom;
- a blow tube having an opening at a bottom end thereof, the blow tube being selectively displaceable between up and down positions while the blow head is on top of the closed blow mold, wherein in its up position the bottom opening of the blow tube is located proximate the top of a blown parison supported within the closed blow mold and in its down position the blow tube is located proximate the bottom of the blown parison supported within the closed blow mold; and
- when the blow head is on top of the closed blow mold following a parison in the blow mold being blown, reciprocating the blow tube according to a displacement profile from said up position to a first down position, from said first down position to a second up position, from said second up position to a second down position, from said second down position to a third up position.

7. The method according to claim 6, wherein the displacement profile is defined such that the bottom opening of the blow tube is displaced from the up position to a location where the upper neck portion of the blown parison supported within the closed blow mold meets the lower body portion of the blown parison supported within the closed blow mold at an average velocity greater than the average velocity at which the bottom opening of the blow tube is displaced from the location where the upper neck portion of the blown parison supported within the closed blow mold meets the lower body portion of the blown parison supported within the closed blow mold to the down position of the bottom opening of the blow tube at the bottom of the blown parison.

8. The method according to claim 6, wherein the displacement profile is defined such that the bottom opening of the blow tube is maintained proximate the bottom of the blown parison supported within the closed blow mold for a selected period of time.

9. The method according to claim 6, wherein the displacement profile is defined such that the bottom opening of the blow tube is displaced from the down position of the bottom opening of the blow tube at the bottom of the blown parison to the location where the upper neck portion of the blown parison supported within the closed blow mold meets the lower body portion of the blown parison supported within the closed blow mold at an average velocity less than the average velocity at which the bottom opening of the blow tube is displaced from the location where the upper neck portion of the blown parison supported within the closed blow mold meets the lower body portion of the blown parison supported within the closed blow mold to the up position.

10. A method of operating a blow head mechanism, the blow head mechanism including support means for supporting a blow head assembly, a blow tube selectively displaceable between an up position and a down position, and displacement means for displacing the blow head assembly and the blow tube, the method comprising:
- displacing the blow head assembly between a remote "off" position and an advanced "on" position;
- displacing the blow tube from its up position down to its down position and then back up to its up position;
- displacing the support means by first displacement means to displace the blow head assembly between its remote "off" position and its advanced "on" position;
- displacing the blow tube by second displacement means including a profiled displacement actuator; and
- controlling the profiled displacement actuator in accordance with a displacement profile so as to reciprocate the blow tube from its up position down to its down position at least twice during the time that the blow head assembly is at its "on" position.

11. The method according to claim 10, further comprising blowing a parison in a blow mold of an I.S. machine, displacing the blow tube between its up and down positions at least twice to cool the blown parison, and removing the formed container from the blow mold.

12. The method according to claim 11, further comprising:
- blowing a parison having an upper neck portion and a lower body portion; and
- controlling the profiled displacement actuator in accordance with the displacement profile so as to displace the blow tube from its up position to the location where the upper neck portion meets the lower body portion at an average velocity higher than the average velocity at which the blow tube is displaced from the location where the upper neck portion meets the lower body portion to its down position at the bottom of the container.

13. The method according to claim 12, further comprising:
- maintaining the blow tube proximate the bottom of the container for a selected period of time.

14. The method according to claim 13, further comprising:
- controlling the profiled displacement actuator in accordance with the displacement profile to displace the blow tube from its down position to the location where the upper neck portion meets the lower body portion at a first average velocity; and
- displacing the blow tube from the location where the upper neck portion meets the lower body portion to its up position at a second average velocity;

wherein the second average velocity is greater than said first average velocity.

* * * * *